(12) United States Patent
Fonville

(10) Patent No.: US 8,628,096 B2
(45) Date of Patent: Jan. 14, 2014

(54) ANNULAR SEAL WITH TRAPEZOIDAL CROSS-SECTION

(75) Inventor: Carl E. Fonville, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/005,765

(22) Filed: Jan. 13, 2011

(65) Prior Publication Data

US 2012/0181756 A1    Jul. 19, 2012

(51) Int. Cl.
*F16J 15/02* (2006.01)

(52) U.S. Cl.
USPC .......................................... 277/644; 277/630

(58) Field of Classification Search
USPC ........................................ 277/628, 630, 644
See application file for complete search history.

(56) References Cited

U.S. PATENT DOCUMENTS

| | | | | |
|---|---|---|---|---|
| 3,256,005 A | * | 6/1966 | Taylor | 267/64.13 |
| 4,343,325 A | * | 8/1982 | Fallon | 137/212 |
| 4,501,432 A | * | 2/1985 | Kuniyoshi et al. | 277/591 |
| 5,597,166 A | * | 1/1997 | Grytz et al. | 277/644 |
| 2005/0029749 A1 | * | 2/2005 | Smith, III | 277/602 |

* cited by examiner

*Primary Examiner* — Gilbert Lee
(74) *Attorney, Agent, or Firm* — Quinn Law Group, PLLC

(57) ABSTRACT

An annular seal for sealing between a cylindrical probe and a bore includes a radially inward-facing sealing portion having a first contact height, a radially outward-facing sealing portion having a second contact height, where the first contact height is greater than the second contact height. The seal further includes a vertical-loading portion, and a sloped deformation portion that extends between the vertical-loading portion and the radially outward-facing sealing portion.

17 Claims, 3 Drawing Sheets

ANNULAR SEAL WITH TRAPEZOIDAL CROSS-SECTION

TECHNICAL FIELD

The present invention relates generally to an annular seal for sealing a part within a bore.

BACKGROUND

In various automotive or industrial applications, fluids may often be provided within components or component housings that may lubricate and/or cool inner components. Such components or housings may typically have junctures where shafts, rods, probes, or other components may couple with or extend through the housing. In these circumstances, seals are frequently used between the various mating parts to prevent fluid leakage from between the part interface. For example, in automotive applications, temperature probes typically extend through component housings, such as in the coolant systems, and are configured to measure a temperature of a coolant fluid within the system. Furthermore, in some applications, industry standard seals (e.g., o-rings) won't fit the existing geometry. It is desirable to have a seal surrounding the temperature probe to inhibit the leakage of coolant fluid from the probe-housing interface.

SUMMARY

An annular seal for sealing between a cylindrical probe and a bore includes a radially inward-facing sealing portion having a first contact height, a radially outward-facing sealing portion having a second contact height, and the first contact height being greater than the second contact height. In an embodiment, the first contact height may be at least twice the second contact height.

The seal may further include a vertical-loading portion and a sloped deformation portion that extends between the vertical-loading portion and the radially outward-facing sealing portion. The vertical-loading portion may be configured to interface with a portion of the cylindrical probe, and such contact may be used to urge the seal into a portion of the bore during installation. The vertical-loading portion may further include a radius that transitions from the surface profile into the radially inward-facing sealing portion. In an embodiment, the deformation portion may be configured to bow outward when a radial compression load is applied to the seal.

In an embodiment, the seal may surround an axis of the probe and may be symmetric about a plane orthogonal to the probe axis. Additionally, in an embodiment, the seal may include a pressure-increasing feature on the inward-facing portion. Such a feature may include a bulbous protrusion that may be opposite the outward-facing sealing portion.

In an embodiment, the seal may be used in an assembly for preventing fluid flow between a probe and a bore provided in a housing. The bore may be configured to receive the probe, and may include an enlarged cavity to receive the seal. In an embodiment, the enlarged cavity of the bore may include a chamfer on the receiving end of the cavity, where the bore-facing sealing portion of the seal may be configured to extend entirely beyond the chamfer. In an embodiment, the probe may include a temperature sensing probe configured to monitor a temperature of a fluid contained within the housing.

The above features and advantages and other features and advantages of the present invention are readily apparent from the following detailed description of the best modes for carrying out the invention when taken in connection with the accompanying drawings.

DETAILED DESCRIPTION

Figure 1:
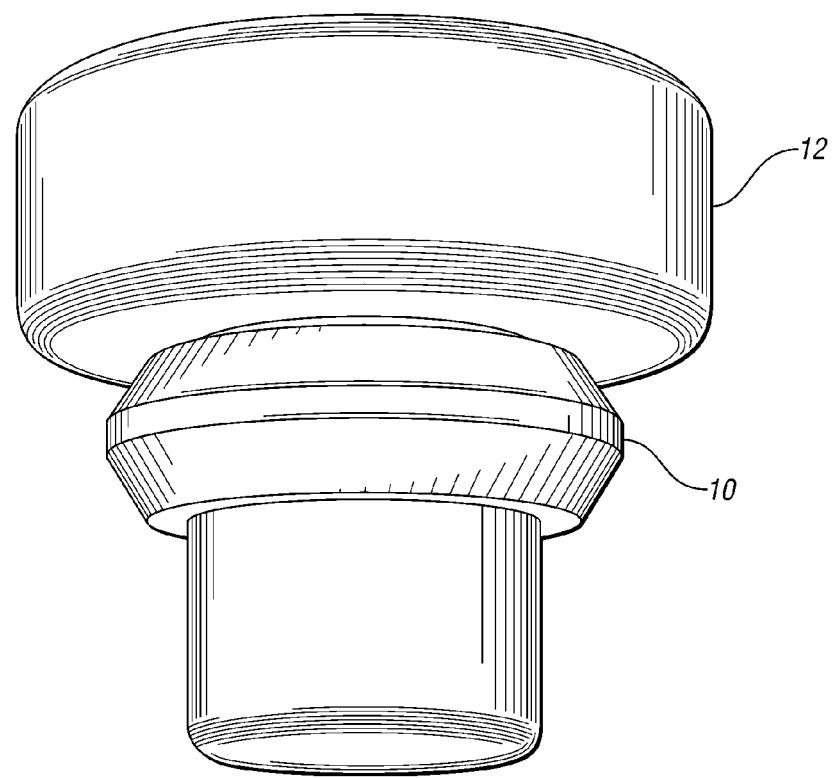
FIG. 1 is a perspective view of an annular seal positioned on a columnar part.
Figure 2:
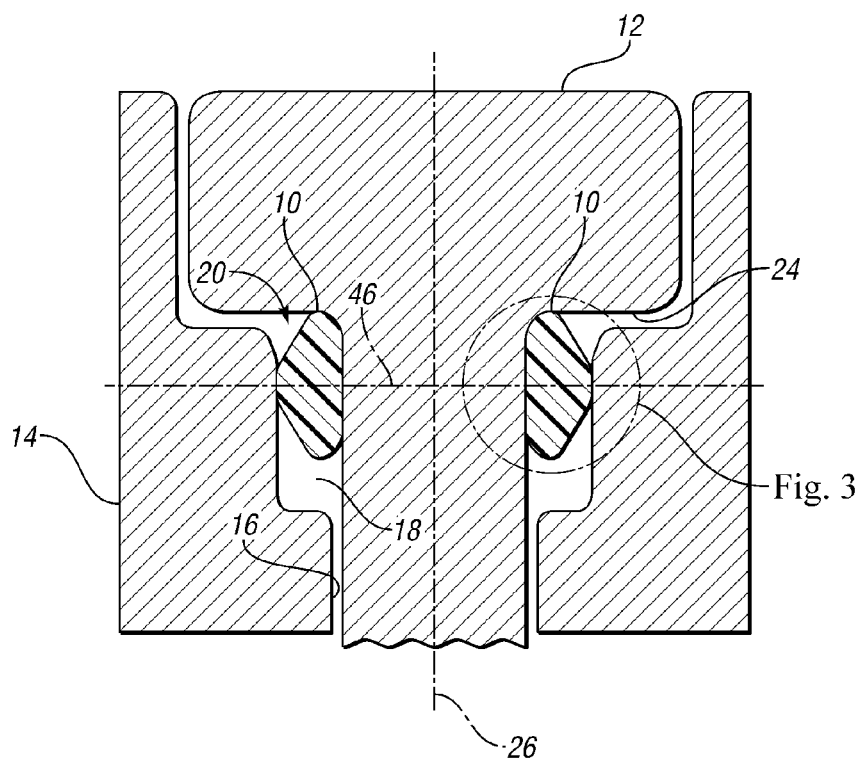
FIG. 2 is a cross-sectional view of an embodiment of an annular seal positioned between a columnar part and a mating bore.

Referring to the drawings, wherein like reference numerals are used to identify like or identical components in the various views, FIG. 1 illustrates an exemplary seal 10 positioned circumferentially around a probe 12. As illustrated, the probe 12 may have a generally columnar shape, however, other probes having differing cross-sectional profiles may be used, and the seal 10 may similarly be adapted to accommodate such geometries. As generally illustrated in FIG. 2, the seal 10 may be used to, for example, create a fluid barrier between the probe 12 and a component or housing 14 that has a bore 16 adapted to receive the probe 12. In an embodiment, the probe 12 may be a temperature probe used to sense a temperature of a part or fluid within the component housing 14. Exemplary components and/or housings may include, without limitation, engine blocks, transmission casings, power train differentials, battery housings, and/or radiator assemblies.

Figure 3:
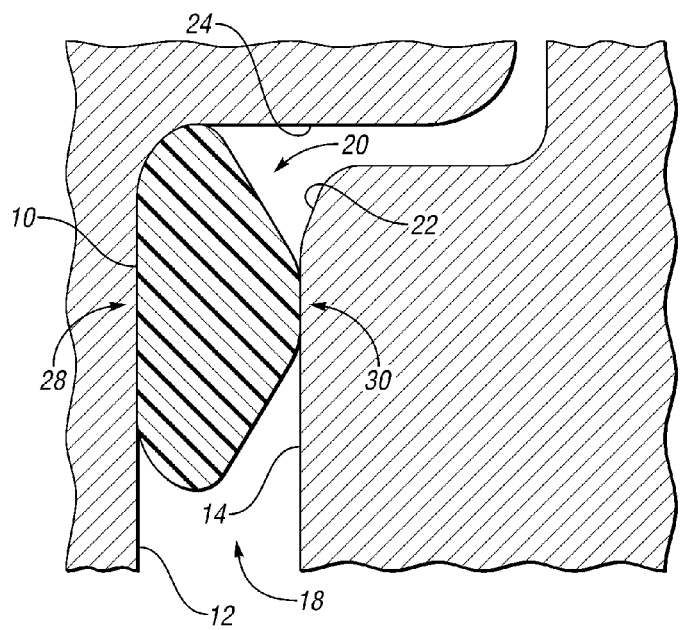
FIG. 3 is an enlargement of the area designated "FIG. 3" from FIG. 2.

To accommodate the seal within the probe/bore interface, a seal-cavity 18 may be provided within the profile of the bore 16. The seal-cavity 18 may be a portion of the bore 16 that is radially larger than the body of the probe 12 and adapted to receive the radial width of the seal 10. As generally illustrated in FIGS. 2 and 3, the seal-cavity 18 may have a receiving end 20 through which the seal 10 may be inserted. In an embodiment, to facilitate insertion of the seal, the receiving end 20 of the seal-cavity 18 may include a chamfer 22 configured to guide the seal 10 into the bore 16. In an embodiment, the probe 12 may include a feature, such as for example, a ridge or face 24, that is configured to contact the seal 10 and to urge the seal into the seal-cavity 18.

In an embodiment, the seal 10 may circumferentially surround the probe 12, and may further be symmetric around a central axis 26. As more clearly shown in FIG. 3, the seal 10 may generally include a first sealing portion 28 that is configured to make contact with the probe 12, and a second sealing portion 30 that is configured to make contact with the bore 16. As used herein, each "sealing portion" may be defined by a region of the seal that may contact the respective probe or bore with sufficient force to impede fluid flow. In an embodiment, the first, or probe-facing sealing portion 28 may be generally directed radially-inward, or towards axis 26, and the second, bore-facing sealing portion 30 may be generally directed radially-outward, or away from axis 26.

Figures 4, 5:
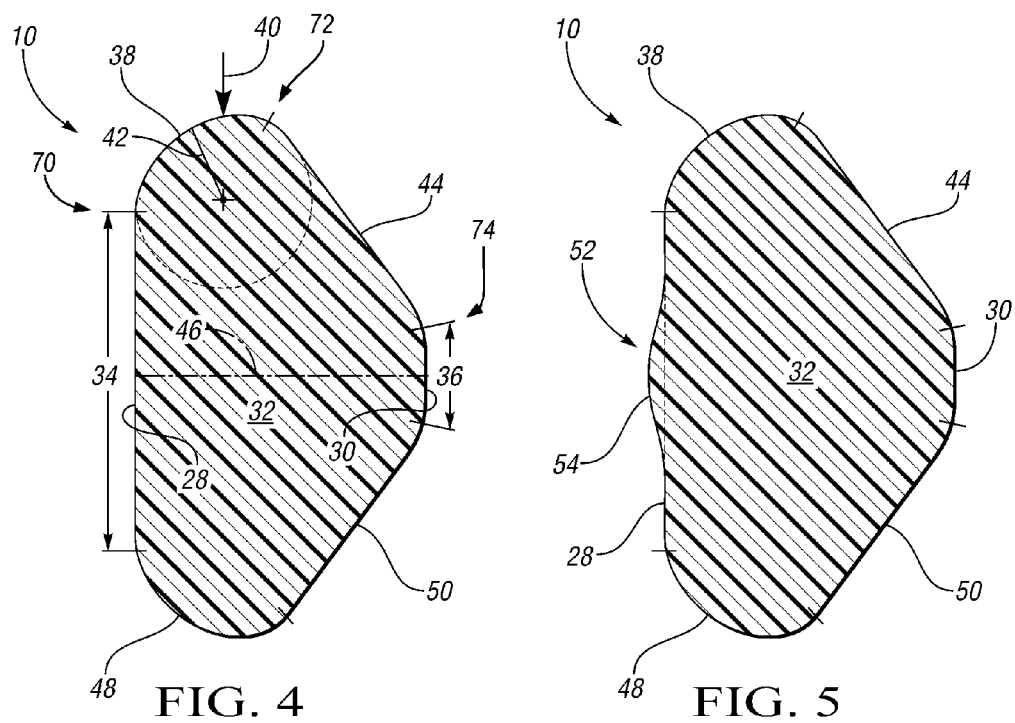
FIG. 4 is a segmented cross-sectional profile of an embodiment of an annular seal.
FIG. 5 is a segmented cross-sectional profile of an embodiment of an annular seal having a pressure-increasing feature.

FIG. 4 further illustrates a cross-sectional profile 32 of an embodiment of a seal 10, such as the seal provided in FIGS. 1-3. As shown, the seal 10 may include a probe-facing sealing portion 28, and a bore-facing sealing portion 30. Each sealing portion 28, 30 may have a respective contact height 34, 36. In an embodiment, the contact height 34 of the probe-facing sealing portion 28 (i.e., the probe-facing contact height) may be greater than the contact height 36 of the bore-facing sealing portion 30 (i.e., the bore-facing contact height). For example, and without limitation, the probe-facing contact height 34 may be between 2 and 10 times larger than the bore-facing contact height 36.

The seal 10 may further include a vertical-loading portion 38 that may contact a feature of the probe 12, such as a face 24. During installation, the vertical-loading portion 38 may receive a pressure or force 40 from the probe 12 that may aid in urging the seal into the seal-cavity 18. In an embodiment, the vertical-loading portion 38 may include a radius 42 that transitions into the probe-facing sealing portion 28. In an embodiment, the radius 42 may be configured to match with a corresponding radius of a portion of a probe 12, such as illustrated in FIG. 2. The seal 10 may further include a sloped deformation portion 44 that extends between the vertical-loading portion 38 and the bore-facing sealing portion 30.

As further illustrated in the embodiment provided in FIG. 4, the seal 10 may include a first transition portion 70 disposed between the radially-inward, probe-facing sealing portion 28 and the vertical-loading portion 38, a second transition portion 72 disposed between the vertical-loading portion 38 and the sloped deformation portion 44, and a third transition portion 74 disposed between the sloped deformation portion 44 and the radially-outward, bore-facing sealing portion 30. As shown, each of the respective first, second, and third transition portions 70, 72, 74 are convex relative to the seal 10. As such, the seal 10 may generally have a trapezoidal cross-sectional profile, as shown.

Referring again to FIG. 2, in an embodiment, the seal may be aligned on a horizontal plane 46 that is orthogonal to the central axis 26 of the probe 12. As generally illustrated in FIG. 2, the seal 10 may be symmetric about this horizontal plane 46, which may allow the seal 10 to be reversible during the assembly/installation procedure. While not necessary to fully practice all benefits of the invention, such a reversible nature may promote a more robust manufacturing process, since less attention may need to be paid to the directionality of the seal during the seal installation. Therefore, as illustrated in FIG. 4, each of the probe and bore-facing sealing portions 28, 30 may be vertically centered on the horizontal plane 46. Similarly, there may be symmetric vertical-loading portions 38, 48 and sloped deformation portions 44, 50 located on each respective side of the plane 46. In an embodiment, portions 44, 50 may work with the bore chamfer 22 in order to reduce the necessary installation force.

In another embodiment, as generally illustrated in FIG. 5, the cross-section 32 of the seal 10 may include a pressure-increasing feature 52 located on the probe-facing sealing portion 28. In an embodiment, the pressure-increasing feature 52 may include a bulbous protrusion 54 opposite the bore-facing sealing portion 30. When the seal is placed under radial compression, such as when it is positioned between the probe 12 and the bore 16 this feature may serve to increase the contact pressure between the bore 14 and the seal 10.

In an embodiment, the seal 10 may be constructed from one or more materials that are capable of a degree of elastic deformation or compliance, and that may further resist taking a compression set. In an embodiment, the material selection for the seal 10 may be suitable for use in high temperature environments, such as within or in close proximity to an automotive powertrain. In an embodiment, the material may also be suitable as a thermal and/or electrical insulator, which may aid in isolating a probe, such as a temperature probe, from a mating bore. An exemplary material selection for coolant system applications may include an ethylene propylene diene monomer (EPDM) rubber, such as, for example, a peroxide-cured EPDM rubber.

Figure 6A:
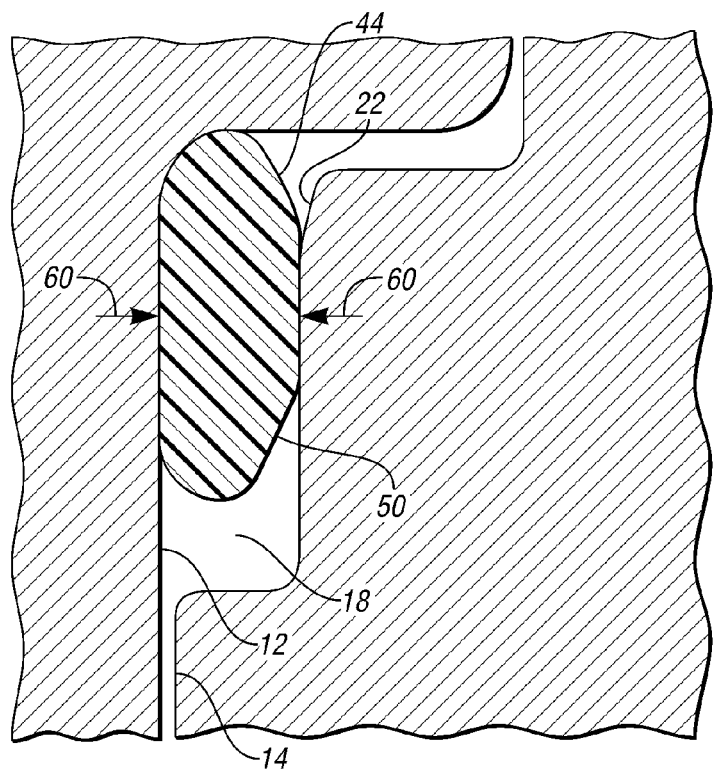
FIGS. 6A-6B are views of the annular seal of FIG. 2 under radial compression.
Figure 6B:
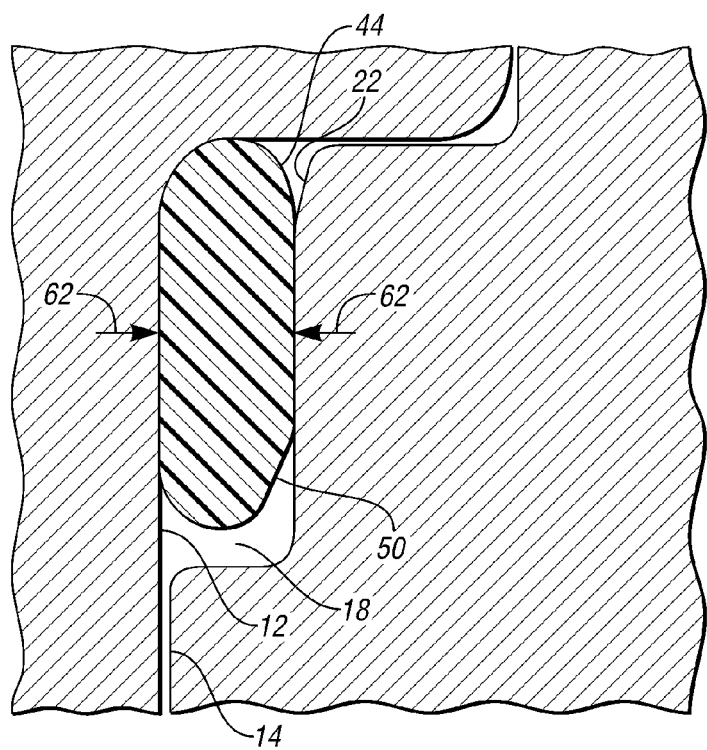

FIGS. 6A and 6B illustrate a seal 10 deforming under varying radial compression loads 60, 62 that may be applied between the probe 12 and bore 16. As shown, the sloped deformation portions 44, 50 may bow outward as the compression loading is increased. In an embodiment, the initially sloped nature of the deformation portions 44, 50 allow the outward deformation during loading, while minimizing further contact with the face 24 of the probe 12 or with the chamfer 22 of the bore 16. As may be appreciated, additional contact with either the face 24 or chamfer 22 may contribute to vertical loads that may undesirably urge the probe 12 out of the bore 16. In an embodiment, the varying radial compression loads 60, 62 may be caused by, for example, variances in part tolerances, the application of clamping pressures, or through thermal expansion of the probe, bore, and/or seal.

While the best modes for carrying out the invention have been described in detail, those familiar with the art to which this invention relates will recognize various alternative designs and embodiments for practicing the invention within the scope of the appended claims. All directional references (e.g., upper, lower, upward, downward, left, right, leftward, rightward, above, below, vertical, and horizontal) are only used for identification purposes to aid the reader's understanding of the present invention, and do not create limitations, particularly as to the position, orientation, or use of the invention. It is intended that all matter contained in the above description or shown in the accompanying drawings shall be interpreted as illustrative only and not as limiting.

The invention claimed is:

1. An annular seal for sealing between a cylindrical probe and a bore, the seal comprising:
   a radially inward-facing sealing portion having a first contact height;
   a radially outward-facing sealing portion having a second contact height, the first contact height being greater than the second contact height;
   a vertical-loading portion; and
   a sloped deformation portion linearly extending between the vertical-loading portion and the radially outward-facing sealing portion;
   wherein the seal surrounds an axis and is symmetric about a plane orthogonal to the axis;
   wherein a first transition portion is disposed between the radially inward-facing sealing portion and the vertical-loading portion, a second transition portion is disposed between the vertical-loading portion and the sloped deformation portion, and a third transition portion is disposed between the sloped deformation portion and the radially outward-facing sealing portion, with the sloped deformation portion extending linearly from the second transition portion to the third transition portion; and
   wherein each of the respective first, second, and third transition portions are convex relative to the seal.

2. The annular seal of claim 1, wherein the inward-facing portion includes a pressure-increasing feature.

3. The annular seal of claim 2, wherein the pressure-increasing feature includes a bulbous protrusion opposite the outward-facing sealing portion.

4. The annular seal of claim 1, wherein the first contact height is at least twice the second contact height.

5. The annular seal of claim 1, wherein the vertical-loading portion is configured to contact a portion of the cylindrical probe.

6. The annular seal of claim 5, wherein the vertical-loading portion is configured such that contact with the probe urges the seal into a portion of the bore.

7. The annular seal of claim 1, wherein the vertical-loading portion includes a radius that transitions to the radially inward-facing sealing portion.

8. The annular seal of claim 1, wherein the deformation portion is configured to convexly bow outward when a radial compression load is applied to the seal.

9. An assembly for preventing fluid flow between a probe and a bore provided in a housing, the assembly comprising:
 a probe;
 a housing including a bore configured to receive the probe, the bore further including an enlarged cavity configured to receive a seal; and
 an annular seal positioned within the enlarged cavity of the bore, the annular seal including a probe-facing sealing portion having a first contact height, and a bore-facing sealing portion having a second contact height, the first contact height being greater than the second contact height, a vertical-loading portion configured to contact a portion of the probe, and a sloped deformation portion linearly extending between the vertical-loading portion and the bore-facing sealing portion;
 wherein the annular seal surrounds an axis of the probe and is symmetric about a plane orthogonal to the axis;
 wherein a first transition portion is disposed between the radially inward-facing sealing portion and the vertical-loading portion, a second transition portion is disposed between the vertical-loading portion and the sloped deformation portion, and a third transition portion is disposed between the sloped deformation portion and the radially outward-facing sealing portion, with the sloped deformation portion extending linearly from the second transition portion to the third transition portion; and
 wherein each of the respective first, second, and third transition portions are convex relative to the seal.

10. The assembly of claim 9, wherein the enlarged cavity of the bore includes a chamfer on the receiving end of the cavity, and the bore-facing sealing portion is configured to extend entirely beyond the chamfer.

11. The assembly of claim 9, wherein the vertical-loading portion includes a radius that transitions into the probe-facing sealing portion, and the probe includes a similar radius configured to engage the radius of the vertical-loading portion.

12. The assembly of claim 9, wherein the probe-facing sealing portion includes a pressure-increasing feature.

13. The assembly of claim 12, wherein the pressure-increasing feature includes a bulbous protrusion opposite the bore-facing sealing portion.

14. The assembly of claim 9, wherein the probe includes a temperature sensing probe configured to monitor a temperature of a fluid contained within the housing.

15. The assembly of claim 9, wherein the deformation portion of the annular seal is configured to convexly bow outward when a radial compression load is applied to the seal.

16. An assembly for preventing fluid flow between a probe and a bore provided in a housing, the assembly comprising:
 a probe;
 a housing including a bore configured to receive the probe, the bore further including an enlarged cavity configured to receive a seal, the enlarged cavity including a chamfer on the receiving end of the cavity; and
 an annular seal positioned within the enlarged cavity of the bore, the annular seal including a probe-facing sealing portion having a first contact height, and a bore-facing sealing portion having a second contact height, a vertical-loading portion configured to contact a portion of the probe and a sloped deformation portion linearly extending between the vertical-loading portion and the bore-facing sealing portion;
 wherein the first contact height is greater than the second contact height, and the bore-facing sealing portion is configured to extend entirely beyond the chamfer;
 wherein the annular seal surrounds an axis of the probe and is symmetric about a plane orthogonal to the axis;
 wherein a first transition portion is disposed between the radially inward-facing sealing portion and the vertical-loading portion, a second transition portion is disposed between the vertical-loading portion and the sloped deformation portion, and a third transition portion is disposed between the sloped deformation portion and the radially outward-facing sealing portion, with the sloped deformation portion extending linearly from the second transition portion to the third transition portion; and
 wherein each of the respective first, second, and third transition portions are convex relative to the seal.

17. The assembly of claim 16, wherein the deformation portion of the annular seal is configured to convexly bow outward when a radial compression load is applied to the seal.

* * * * *